United States Patent
Yazdani et al.

(10) Patent No.: US 10,312,984 B2
(45) Date of Patent: Jun. 4, 2019

(54) DISTRIBUTED AIRBORNE BEAMFORMING SYSTEM

(71) Applicant: Massachusetts Institute of Technology, Cambridge, MA (US)

(72) Inventors: Navid Yazdani, Sudbury, MA (US); David W. Browne, Somerville, MA (US); Keith William Forsythe, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 254 days.

(21) Appl. No.: 15/126,109

(22) PCT Filed: Apr. 16, 2015

(86) PCT No.: PCT/US2015/026114
§ 371 (c)(1),
(2) Date: Sep. 14, 2016

(87) PCT Pub. No.: WO2015/161040
PCT Pub. Date: Oct. 22, 2015

(65) Prior Publication Data
US 2017/0085307 A1    Mar. 23, 2017

Related U.S. Application Data

(60) Provisional application No. 61/980,097, filed on Apr. 16, 2014.

(51) Int. Cl.
*H04B 7/06* (2006.01)
*H04B 7/185* (2006.01)

(52) U.S. Cl.
CPC ....... *H04B 7/0617* (2013.01); *H04B 7/18502* (2013.01)

(58) Field of Classification Search
CPC .................. H04B 7/0617; H04B 7/18502
See application file for complete search history.

(56) References Cited

U.S. PATENT DOCUMENTS

2002/0128045 A1* 9/2002 Chang ............... H01Q 1/246
455/562.1
2006/0022089 A1 2/2006 Lloyd
(Continued)

FOREIGN PATENT DOCUMENTS

WO    WO 2014/160997 A1    10/2014

OTHER PUBLICATIONS

Hong, et al.; "Cooperative Communications in Resource-Constrained Wireless Networks;" [Exploiting Spatial Diversity Gains in Multiuser Wireless Networks]; IEEE Signal Processing Magazine; May 2007; pp. 47-57 (11 pages).
(Continued)

*Primary Examiner* — Christopher M Crutchfield
*Assistant Examiner* — Tito Q Pham
(74) *Attorney, Agent, or Firm* — Daly, Crowley, Mofford & Durkee, LLP

(57) ABSTRACT

A distributed beamforming communication system including independent aerial nodes forming an antenna array is described. Described herein is a distributed beamforming array which utilizes independent aerial relay nodes or platforms (i.e. no strict control of relay node position, no communication between the relay nodes, and no coordinated transmission among the relay nodes) to form a distributed beamforming antenna.

20 Claims, 8 Drawing Sheets

(56) References Cited

U.S. PATENT DOCUMENTS

| | | | |
|---|---|---|---|
| 2006/0063529 A1* | 3/2006 | Seligsohn | B64B 1/44 455/431 |
| 2008/0247351 A1* | 10/2008 | Dankberg | H04B 7/18534 370/316 |
| 2009/0051594 A1* | 2/2009 | Na | H04B 7/0854 342/373 |
| 2011/0013711 A1 | 1/2011 | Wang et al. | |
| 2011/0316739 A1* | 12/2011 | Chang | G01S 19/21 342/357.62 |
| 2012/0182895 A1* | 7/2012 | Jwa | H04W 72/046 370/252 |
| 2014/0022979 A1 | 1/2014 | Chen et al. | |
| 2014/0266872 A1* | 9/2014 | Mitola, III | H04B 7/195 342/356 |
| 2014/0269198 A1* | 9/2014 | Ray | G01S 3/808 367/123 |
| 2015/0146712 A1* | 5/2015 | Jin | H04W 56/006 370/350 |
| 2015/0358104 A1* | 12/2015 | Ohwatari | H04B 7/0456 370/252 |
| 2016/0087714 A1* | 3/2016 | Sayegh | H04B 7/18513 370/316 |

OTHER PUBLICATIONS

Palat, et al.; "Cooperative Relaying for Ad-Hoc Ground Networks Using Swarm UAVS;" IEEE Military Communications Conference, 2005; Milcom 2005; Oct. 17-20, 2005; pp. 1-7 (7 pages).

Uher, et al.; "Review of Distributed Beamforming;" Journal of Telecommunications and Information Technology; Jan. 2001; pp. 78-88 (11 pages).

Van Veen, et al.; "Beamforming: A Versatile Approach to Spatial Filtering;" IEEE ASSP Magazine, Apr. 1988; pp. 4-24 (21 pages).

PCT Search Report of the ISA for PCT Appl. No. PCT/US2015/026114 dated Aug. 28, 2015 (4 pages).

PCT Written Opinion of the ISA for PCT Appl. No. PCT/US2015/026114 dated Aug. 28, 2015 (6 pages).

\* cited by examiner

DISTRIBUTED AIRBORNE BEAMFORMING SYSTEM

CROSS REFERENCE TO RELATED APPLICATIONS

This application is a U.S. National Stage of PCT application PCT/US2015/026114 filed in the English language on Apr. 16, 2015, and entitled "DISTRIBUTED AIRBORNE BEAMFORMING SYSTEM," WhiCh claims the benefit under 35 U.S.C. § 119 of provisional application No. 61/980,097 filed Apr. 16, 2014, which application is hereby incorporated herein by reference.

STATEMENT REGARDING FEDERALLY SPONSORED RESEARCH

This invention was made with Government support under Contract No. FA8721-05-C-0002 awarded by the U.S. Air Force. The Government has certain rights in the invention.

FIELD

The concepts, systems, circuits, devices and techniques described herein relate generally to beamforming systems and more particularly to distributed beamforming systems and related techniques utilizing an antenna array comprising aerial relay nodes.

BACKGROUND

As is known in the art, beamforming systems allow a user having an antenna with multiple transmit/receive elements to adjust delay, phase and amplitude weights applied to each element to create a desired beam pattern.

Adaptive beamforming systems allow dynamic adaption of the weights to adjust an antenna pattern and to increase, and ideally maximize, a desired signal-to-noise ratio. Traditional and adaptive beamforming array antennas (or more simply "arrays") are typically provided having one-half wavelength spacing between antenna elements which make up the array. Distributed beamforming arrays (i.e. beamforming arrays having an element spacing which is not one half wavelength) have more recently gained interest, particularly with respect to distributed sensors which individually are limited in power, but can cooperatively coordinate their communication to gain advantage through beamforming.

SUMMARY

Described herein is a distributed beamforming array which utilizes independent aerial relay nodes or platforms (i.e. no strict control of relay node position, no communication between the relay nodes, and no coordinated transmission among the relay nodes) to form a distributed beamforming antenna.

The aerial relay nodes are not coordinated in position or communication. The beamforming is digitally performed at a processing site (such as a ground-based receiver) and can be used to increase system capacity or to mitigate interference.

In an embodiment, a system includes two or more aerial relay nodes, at least one of which can move independently of the other aerial relay node and receiver to receive an analog transmission from each of the two or more aerial relay nodes. The receiver converts the aerial relay node analog transmissions to corresponding digital representations of each transmission at an output thereof. The aerial relay node transmission comprises at least a data message and a reference signature for calculation of the desired beamforming weights.

An adaptive beamforming processor, coupled to the output of the receiver, may be configured to: receive a digital representation of the aerial relay node transmission including the reference signature for calculation of desired beamforming weights from each of the two or more aerial relay nodes and generate a set of beamforming weights for the signals received from two or more aerial relay nodes. The weights are based at least in part upon the reference signature signal characteristics received from each respective aerial relay node and the set of weights compensates for at least physical spacing, relative motion, and signal timing of the aerial relay nodes. The adaptive beamforming processor applies the weights to the respective transmission from respective ones of the aerial relay relay nodes to form a desired beam; and the system then processes the signal received to recover the data message from the aerial relay node transmission.

BRIEF DESCRIPTION OF THE DRAWINGS

The foregoing and other objects, features and advantages of the concepts. Systems and techniques described herein will be apparent from the following description of particular embodiments, as illustrated in the accompanying drawings in which like reference characters refer to the same parts throughout the different views. The drawings are not necessarily to scale, emphasis instead being placed upon illustrating the principles of the concepts, systems, circuits and techniques sought to be protected herein.

DETAILED DESCRIPTION

Figure 1:
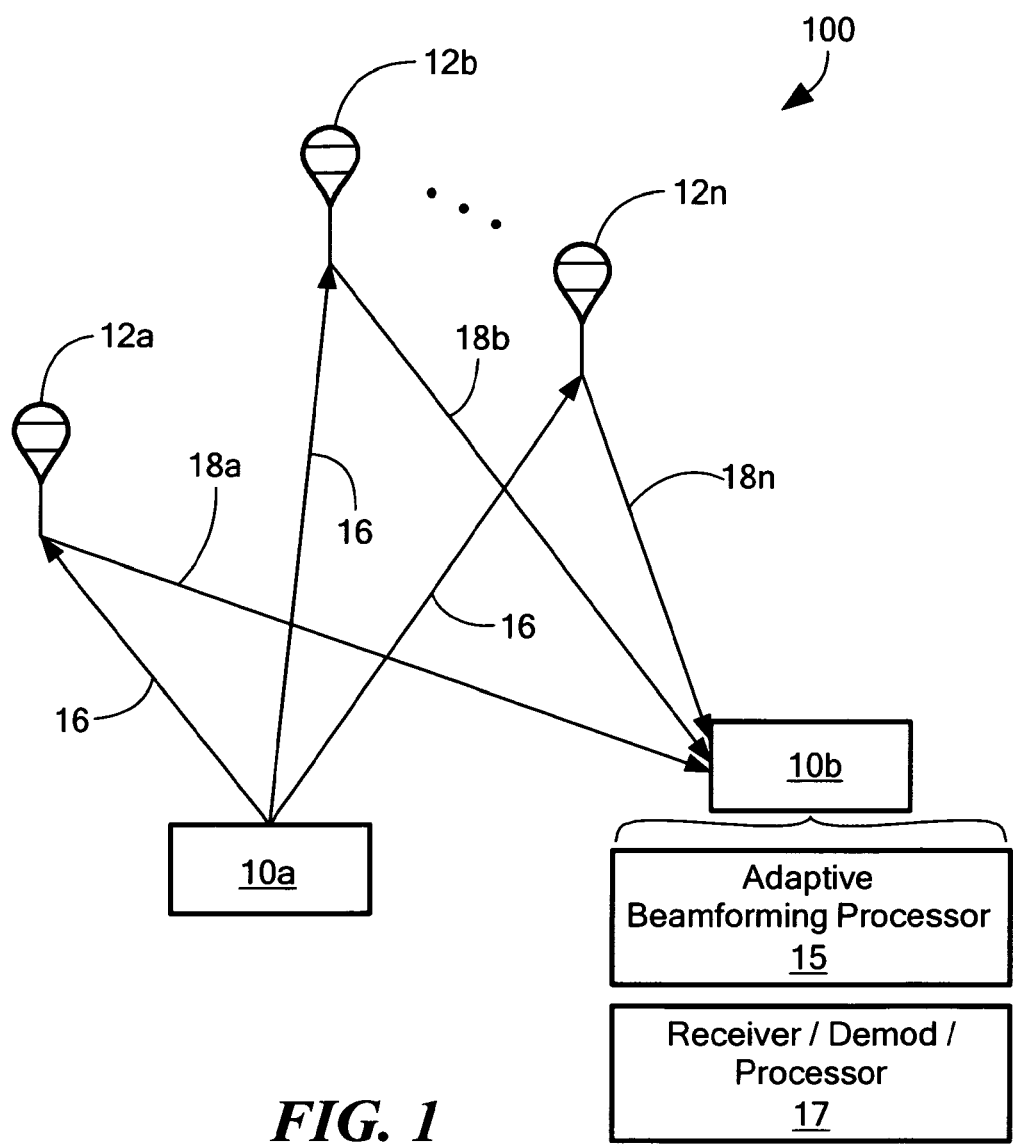
FIG. 1 is a block diagram of a distributed airborne adaptive beamforming system.

Referring now to FIG. 1, communication system 100 includes communication platforms 10a and 10b which may wish to communicate with one another. As shown in FIG. 1, communication platforms 10a and 10b may be seagoing vessels such as boats or submarines. In other embodiments, one or both of communication platforms 10a and 10b may be land-based platforms (e.g. cars or trucks, computers, land-based communication stations, mobile radios, cellphones or other mobile devices, etc.) or sea going vessels (e.g. boats, ships, seaborne platforms, etc.). Although only two communication platforms are shown in the illustrative embodiment of FIG. 1, communication system 100 can include more than two communication platforms communicating with each other.

A communication signal 16 (also sometimes referred to herein as a user signal) transmitted from platform 10a is relayed through one or more aerial relay nodes 12a-12n to platform 10b.

As will be discussed in more detail below in conjunction with FIG. 5, embodiments which include one or more interfering platforms for proper operation of the beamforming system described herein, the number of aerial relay nodes 12a-12n should be greater than the number of interfering platforms (e.g. interfering platform 502 in FIG. 5).

Interfering platforms may be users that are planned by the system to interfere in time and frequency to increase system capacity while allowing the beamforming system to mitigate that planned interference, or the interference sources could be unplanned external sources (e.g. a jammer). In general, it is not necessary to have more aerial relay nodes than communication platforms, however in cases where interfering nodes exist it is desirable that the number of aerial relay nodes be greater than the number of interfering nodes.

For example a system with 10 MHz of bandwidth could assign 1 MHz of bandwidth to each of 10 users and this would not result in interference between the users. If 10 more users were subsequently added on top of the existing 10 (so 20 users total) then two relays would be required because each user would have one interference source—one user interfering with them (i.e. each 1 MHz of bandwidth would have two users in it).

In the example embodiment of FIG. 1, the platforms 10a and 10b are illustrated as sea vessels and the aerial relay nodes 12a-12n are illustrated as balloons—e.g. high altitude balloons such as those able to reach heights of 10 km or more. As noted above, the communication platforms may be any mobile or stationary ground-based vehicles (e.g. handheld devices, cars, trucks or buildings) or mobile or stationary water-based vehicles (e.g. stationary platforms or ships or other water-based vehicles) or mobile or stationary near-ground-based vehicles (e.g. low altitude manned or unmanned aircraft or vehicle) or mobile or stationary air-based vehicle (e.g. any manned or unmanned aircraft or vehicle). In short, any platform, below the aerial relay nodes 12a-12n may act as a communication platform 10a, 10b.

Aerial relay nodes 12a-12n may also be provided as any number of a wide variety of moving or stationary aerial platforms (e.g. high altitude balloons, quadcopters, tethered-balloons or other aircraft, kites or any manned or unmanned air-based vehicle or aircraft or satellite) and they can be a mix of different types of aerial nodes (i.e. all aerial relay nodes may or may not be of the same type). In an embodiment, the aerial relay nodes are balloons or other platforms where at least one of the relay nodes can move independently of the other relay nodes. In other embodiments, there may be two or more relay nodes in an array that are coupled one or more of the platforms (e.g. one or more of the balloons) so that at least some of the relay nodes (i.e. the relay nodes associated with a same balloon) are spatially fixed with respect to each other.

As noted above, antennas in a conventional beamforming array are typically spaced at regular intervals, for example half-wavelengths apart.

However, the aerial relay nodes 12a-12n forming the antenna array as described herein are independent (i.e. not physically coupled to each other (i.e. and may move so they are spaced at irregular and unknown spatial intervals. Also, the aerial relay nodes 12a-12N are typically spaced much further apart than one half-wavelength distance. In some embodiments, the aerial relay nodes may be kilometers apart while operating at frequencies up to 106 GHz and above.

In one example embodiment, each platform 10a and/or 10b transmits signals to the aerial platforms 12a-12n using a broad beam antenna that can simultaneously transmit to multiple aerial platforms, (i.e. an antenna having a radiation pattern which is broad enough to simultaneously transmit to multiple relays). Each aerial relay antenna node 12a-12n also transmits and receives signals using a broad beam antenna. It is desirable for a user signal or an uplink signal to be received at multiple relay nodes and for an aerial relay node downlink signals to be received at multiple ground-based (or near ground-based) receiver. Using broad beam antennas in both the communication platforms 10a, 10b and the aerial relay nodes 12a-12n (collectively "nodes"), allows one antenna in each node to "see" (i.e. receive signals from and/or transmit signals to, as appropriate) all nodes and receive all signals of interest. While the relatively large number of signals could be transmitted and received using directional a relatively large number of antennas, in systems having a large number of nodes, would be required to capture all of the signals and it may be difficult or expensive to provide enough directional antennas for a system that supports a large number of users.

In an embodiment, at least some aerial relay nodes are independent of other nodes (i.e. at least some nodes do not communicate with each other to coordinate their position within the antenna array). The aerial relay nodes also may not communicate their position with the communication platforms. In such embodiments, at least some relay nodes do not have information about their own position or motion, the position or motion of other relay nodes, or the position or motion of the communication platforms. Similarly, the communication platforms may not have information about the position or motion of the relay nodes or of other communication platforms.

In other embodiments, the aerial relay nodes may communicate with each other to coordinate position, timing, clocks, or other parameters.

The aerial relay nodes may be, for example, simple repeaters that receive signal 16 and amplify and re-broadcast or otherwise re-transmit signal 16 as signals 18a-18n. In other embodiments, the aerial relay nodes may include amplifiers, filters, or other signal processing or signal shaping circuits that can operate on signal 16 before re-transmitting the signal. The aerial relay nodes may also include a power source to provide power for transmitting signals 18a-18n.

In some embodiments, the transmitted signals 18a-18n may be frequency modulated, where each relay node uses a unique modulation frequency, so that the receiving platform 10b can identify which signal 18a-18n came from which aerial relay node 12a-12n. In other embodiments, the aerial relay notes may coordinate timing of broadcasted signals 18a-18n using a time-division multiplexing scheme. The receiving platform 10b can then identify which signal 18a-18n came from which aerial relay node 12a-12n based on the time or sequence in which the signal 18a-18n was received.

In other embodiments, the system may include a ground-based beam forming antenna that can point an antenna beam at each of the aerial relay nodes individually. The ground-based antenna may substantially simultaneously steer n beams to n different aerial relay nodes which can be repeated by the relay nodes and received by the receiving communication platform 10b.

In other embodiments, the aerial relay nodes can transmit signals 18a-18n according to a time division multiple access (TDMA) scheme, where each aerial relay node transmits its signal during a predetermined time slot. For example, node 1 may transmit first, node 2 may transmit second, etc.

In other embodiments, a space division multiple access scheme, code division multiplexing scheme, or any other method can be used so that receiving platform 10b can differentiate the received signals 18a-18n and identify the aerial relay from which the signal was transmitted.

One or more of the communication platforms 10a and 10b may include an adaptive beamforming processor 15 and/or a receiver/demodulation processor 17. Beamforming processor 15 and demodulation processor 17 may operate to receive signals 18a-18n and to recover a message included therein. As will be discussed below, beamforming processor 15 receives reference signature from the aerial relay nodes 12a-12n so that beamforming processor 15 can generate weight, phase, and delay vectors based on the current state of the antenna array and form a beam from the received signals 18a-18n. Although beamforming processor 15 and demodulation processor 17 are shown as associated with communication platform 10b, any communication platform that receives signals 18a-18n from aerial relay nodes 12a-12n may include a like beamforming processor and/or demodulation processor.

Figure 2:
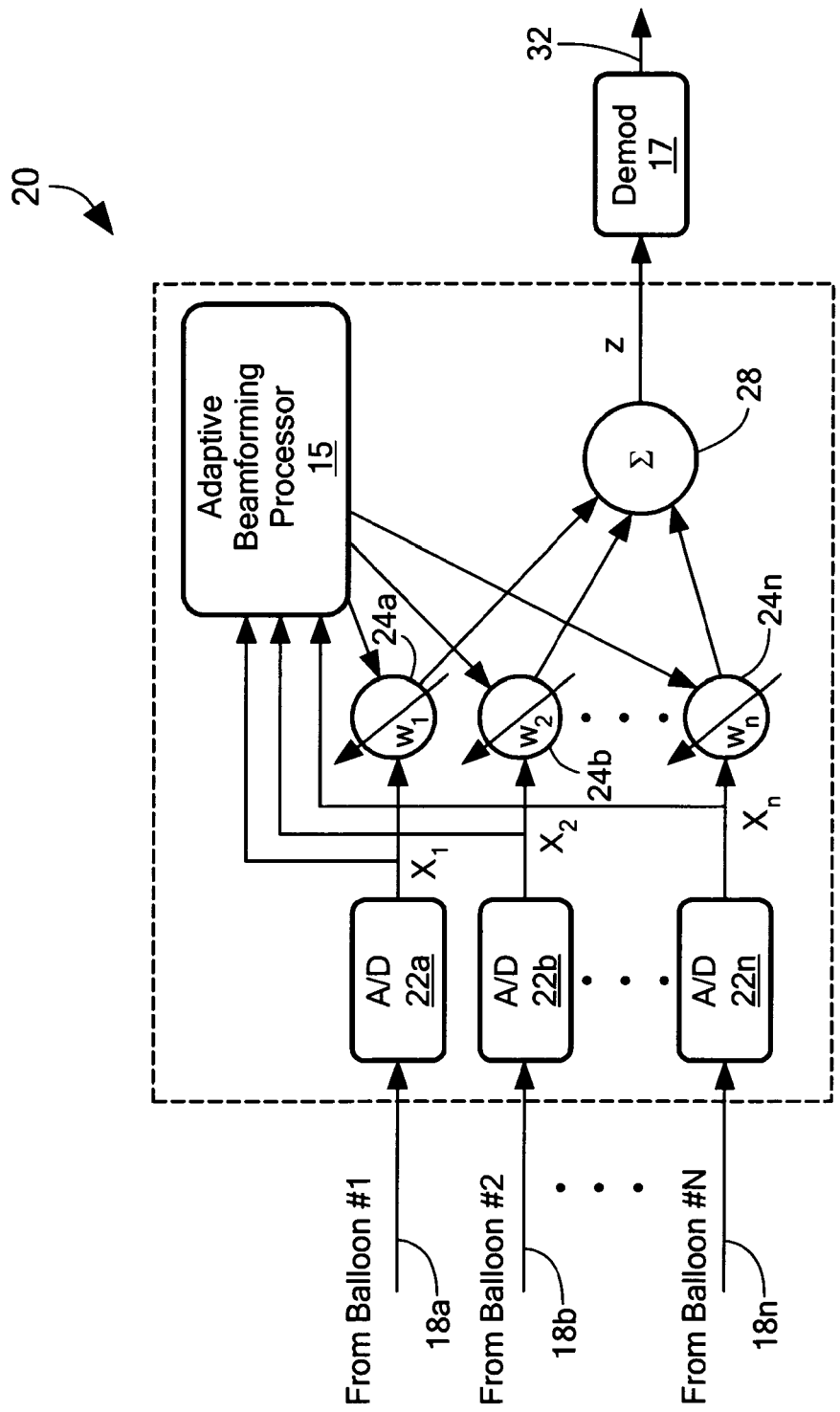
FIG. 2 is a block diagram of an adaptive beamforming system including an adaptive beamforming processor.

Referring now to FIG. 2, a beamforming receiver system 20 performs beamforming processing at a receive node (e.g. platform 10b in FIG. 1). The beamforming system 20 comprises adaptive beamforming processor 15 and demodulation processor 17, which are also shown in FIG. 1. Beamforming system 20 receives combined, frequency-translated signals 18a-18n from each of the N aerial relay nodes on N independent frequency channels. The signals 18a-18n are provided to inputs of analog-to digital converters (ADCs) 22a-22n which produce a bit-stream representative of the signals provided thereto. In at least some embodiments, the signals 18a-18n are down-converted from RF frequencies to IF frequencies before being provided to the input of the ADCs 22a-22n. The digital signals are provided to delay, phase and amplitude adjustment circuitry 24a-24n as well as to adaptive beamforming processor 15.

The adaptive beamforming processor 15 performs signal processing to identify delay, phase, and amplitude weights that increase (and ideally maximize) the signal to noise ratio (SNR) of the desired signal as identified by a reference signature included as part of the received signals. If an interfering node is present, the beamforming processor may also perform signal processing to identify delay, phase, and amplitude weights that decrease (and ideally minimize) the signal-to-noise ratio of the interfering signal. The phase and amplitude adjustment circuits 24a-24n adjust the delay, phase, and amplitude before combining the signals to maximize the signal to noise ratio based on the delay, phase, and amplitude adjustments provided by adaptive beamforming processor 15.

In embodiments, adaptive beamforming processor 15 may be a circuit that performs the features and functions described herein. In other embodiments, beamforming processor 15 may be a processor that executes software (i.e. software, firmware, or another type of instruction stored in memory that can be executed by a processor) to effectuate the features and functions described herein. Adaptive beamforming processor 15 may also comprise a combination of circuits, processor(s), and software instructions to perform the features and functions described.

Phase and amplitude adjustment circuits 24a-24n provide appropriately weighted and phased signals to a summing circuit 28. Summing circuit 28 sums the signals provided thereto to form a beam at an output thereof. The output of summing circuit 28 is coupled to an input of a demodulator processor 17 which demodulates the signal provided thereto to provide an output signal 32. Output signal 32 contains substantially all of the information transmitted by communication platform 10a. Thus, communication platform 10a is able to communicate with communication platform 10b (or with any other communication platforms) using the technique(s) described herein.

In one example, platform 10a transmits a signal via a broad beam antenna. The so transmitted signal is received by two or more of the aerial relay nodes 12a-12n. As noted above, for desired operation, the system requires at least one more aerial relay nodes than interferer so if one interferer exists, then at least two aerial relay nodes are needed. It should be noted that, in general, system performance improves with more aerial relay nodes. As noted above, in one illustrative embodiment, each aerial relay node 12a-12n that receives the signal from platform 10a relays the signal received on a frequency channel different from the frequency channels used by other ones of the other aerial relay nodes.

In another example, platform 10a transmits a first signal and platform 10b transmits a second signal. The first and second signals are received by aerial relay nodes 12a-12n. The aerial relay nodes 12a-12n mix the first signal and the second signal received and relay the mixed signal (i.e., aerial relay node 12a would transmit the mixed signal via a first channel, aerial relay node 12b would transmit the mixed signal via a second channel, etc.). The receiver node combines the mixed signals received from the aerial relay nodes on the n channels and extracts the first signal transmitted from platform 10a and extracts the second signal transmitted from platform 10b.

In one illustrative embodiment, a user signal is embedded with a reference signature which allows the beamforming processing to improve (and ideally maximize) signal-to-noise (SNR) without knowledge of the user or jammer (i.e. interferer) location. Embodiments of signature embedment may include a predefined pattern of reference bits embedded in the bit-stream identifying the user, a direct sequence spreading sequence identifying the user, or a frequency hopping pattern identifying the user. In other embodiments, the reference signature may comprise a pseudo-random code or signature hopping pattern that is known to the receiver platform. There are multiple options of beamforming processing techniques that can be adapted for use. As one of ordinary skill in the art would recognize, adding additional aerial relay nodes allows the user additional degrees of freedom to attenuate interfering sources and also to recover a user signal at a receiver node.

Figure 2A:
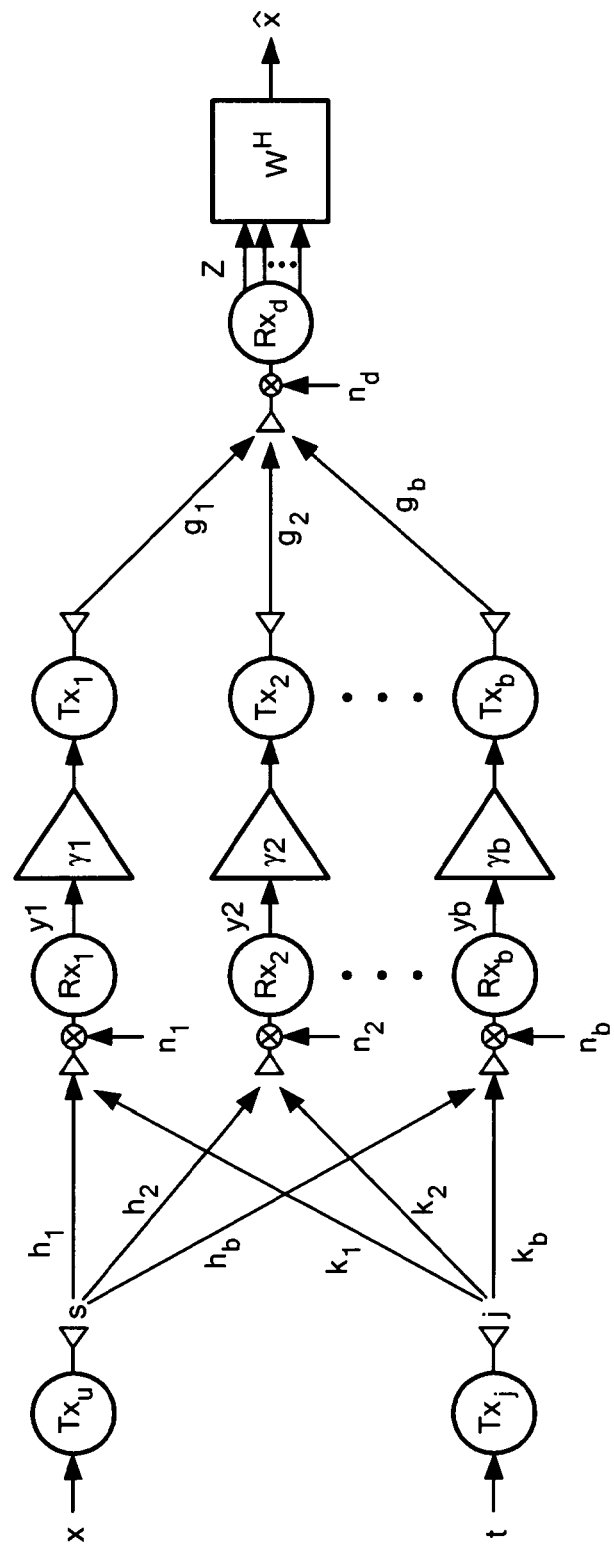
FIG. 2A is a block diagram of a beamforming processor and related systems.

Referring to FIG. 2A, a block diagram 200 illustrates an end to end system model of a beamforming technique which may be implemented, in whole or in part, by beamforming processor 15. An uplink signal x may have unity power so that $$\|x\|_F^2 = n_s$$

The uplink signal may be a reference signature that is known by the downlink receiver, e.g. by the adaptive beamforming processor 15.

The transmitted uplink signal, s, may represent the amplified signal $$s = \sqrt{P_s} x$$

where $P_s$ is the energy per sample and may account for all transmit gain in the uplink terminal. A communication channel h between the uplink terminal antenna and the $n_b$ aerial relay antennas is given as:

$$h \in \mathbb{C}^{n_b \times 1}$$

The received signal across the array of aerial relay nodes is:

$$Y = \sqrt{P_s} h x + N_b$$

where the noise internal to the receive array is:

$$N_b \in \mathbb{C}^{n_b \times n_s}$$

The noise $N_b$ may have circularly symmetric Gaussian distribution with zero mean and covariance such that:

$$\varepsilon\{N_b N_b^{H}\} = \sigma_b^2 I.$$

The $i^{th}$ aerial relay node may scale its received signal by a factor of $\gamma_{ii}$ to the relay node's maximum transmit dynamic range, before transmitting the result in the $i^{th}$ slot of the downlink's TDMA frame (assuming a TDMA scheme is being used). The re-scaled receive array signal may be represented by:

$$\Gamma = \begin{bmatrix} \gamma_1 & 0 & 0 \\ 0 & \ddots & 0 \\ 0 & 0 & \gamma_b \end{bmatrix}$$

In this example, a time-division multiple access (TDMA) scheme may be used for the signals received from the aerial relay nodes, as described above. The TDMA frame Z received at the downlink terminal may be given by:

$$Z = G\Gamma Y + N_d$$
$$= \sqrt{P_s}\, G\Gamma h x + G\Gamma N_b + N_d$$
$$= hx + N$$

where $$h = \sqrt{P_s}\, G\Gamma h$$

and $N_d$ is the noise internal to the downlink receiver and may have circularly symmetric Gaussian distribution with zero mean and covariance. A channel-allocation matrix G allocates the received uplink signals at the $n_b$ relay nodes to the $n_b$ slots of the TDMA downlink frame. G may be represented as:

$$G = \begin{bmatrix} g_1 & 0 & 0 \\ 0 & \ddots & 0 \\ 0 & 0 & g_b \end{bmatrix}$$

In the matrix above, $g_i$ is the channel coefficient between the $i^{th}$ relay node's antenna and the downlink terminal's antenna. Equivalently, a space-frequency channel-allocation for a frequency diversion multiple access (FDMA), collision detection multiple access (CDMA), or other type of downlink could be used. In an embodiment, the uplink and downlink channels are assumed to be narrowband (i.e. the delay spread of the channel is assumed to be zero).

If an interference node or jammer is present, the jam signal t may have unity power and may be unknown by the receiver. The transmitted jam signal on the uplink channel j may be given by:

$$j = \sqrt{P_j}\, t$$

where $P_j$ is the energy per sample. In embodiments, it may be assumed that x and t are independent (i.e. uncorrelated) variables. The channel between the jammer's antenna and the array of relay nodes may be referred to as k. In the presence of the jammer signal, the received signal across the array of relay modules may be given by:

$$Y = \sqrt{P_s} h x + \sqrt{P_j} k t + N_b$$

and the TDMA frame received at the downlink terminal may be:

$$Z = G\Gamma Y + N_d$$
$$= \sqrt{P_s}\, G\Gamma h x + \sqrt{P_j}\, G\Gamma k t + G\Gamma N_b + N_d$$
$$= hx + kt + N$$

where $$k = \sqrt{P_j}\, G\Gamma k$$

The respective covariances of the signal-of-interest, the interference signal, and the noise signal at the downlink terminal are:

$$R_S = \varepsilon\{hxx^H h^H\}$$
$$= \frac{1}{n_s}\|x\|^2 hh^H$$
$$= hh^H$$

$$R_J = \varepsilon\{ktt^H k^H\}$$
$$= \frac{1}{n_s}\|t\|^2 kk^H$$
$$= kk^H$$

$$R_N = \varepsilon\{NN^H\}$$
$$= \varepsilon\{G\Gamma N_b(G\Gamma N_b)^H + N_d N_d^H\}$$
$$= \sigma_b^2 GG^H \Gamma\Gamma^H + \sigma_d^2 I$$

The covariance of the received downlink signal is:

$$R_Z = \varepsilon\{ZZ^H\}$$
$$= R_S + R_J + R_N$$
$$= R_S + Q$$

Without beamforming, the signal-to-noise plus interference ration (SINR) at the downlink terminal for the relay path through the $i^{th}$ balloon is:

$$SINR_i = \frac{\varepsilon\{\|h_{[i]}x\|^2\}}{\varepsilon\{\|k_{[i]}t + n_i\|^2\}}$$
$$= \frac{\varepsilon\{\|h_{[i]}\|^2\}}{\varepsilon\{\|k_{[i]}\|^2\} + \varepsilon\{\|n_i\|^2\}}$$
$$= \frac{P_s|g_i|^2\gamma_i^2|h_i|^2}{P_j|g_i|^2\gamma_i^2|k_i|^2 + |g_i|^2\gamma_i^2\sigma_b^2 + \sigma_d^2}$$

The output of the beamformer at the downlink terminal is $$\hat{x} = w^H Z$$

and the SINR at the output of the beamformer is:

$$SINR_w = \frac{\varepsilon\{\|w^H hx\|^2\}}{\varepsilon\{\|w^H(kt+N)\|^2\}}$$
$$= \frac{w^H R_S w}{w^H(R_j + R_N)w}$$
$$= \frac{w^H R_S w}{w^H Q w}$$

The beamforming weight vector that maximizes SINR is $$w = \underset{w_i}{\mathrm{argmax}} SINR_w$$
$$= Q^{-1}h$$

Computing w may require knowledge of parameters in the model that are impractical to acquire. For example, the parameters h, k, and N are related to random physical processes that may be changing and are therefore unknown a priori. This in turn means that Q is random, dynamic and unknown a priori. Furthermore, Q depends on the interference signal, t, which itself may be unknown a priori or, if t it belongs to a known class of signals, there may be significant uncertainty about specific embodiment of the interference signal. Thus, an estimate of w can be computed as follows. The least-squares channel estimate may first be computed as:

$$\hat{h} = Zx^+$$
$$= Zx^H(xx^H)^{-1}$$
$$= \frac{1}{n_s}Zx^H$$

where the notation $x^+$ denotes the pseudo-inverse of x. An estimate of Q can be computed from the projection of the received signal into a space orthogonal to the desired signal. The orthogonal projection matrix is computed as:

$$P_x^+ = I - x^+ x$$
$$= I - x^H(xx^H)^{-1}x$$
$$= I - \frac{1}{n_s}x^H x$$

The estimate of Q may then be computed as $$\hat{Q} = \frac{1}{n_s}Z P_x^+ Z^H$$
$$= \frac{1}{n_s}Z\left(I - \frac{1}{n_s}x^H x\right)Z^H$$
$$= \frac{1}{n_s}ZZ^H - \frac{1}{n_s^2}Zx^H x Z^H$$

$$= \frac{1}{n_s}ZZ^H - \hat{h}\hat{h}^H$$

Where the estimate of the beamformer is:

$$\hat{w} = \hat{Q}^{-1}\hat{h}.$$

Figure 2B:
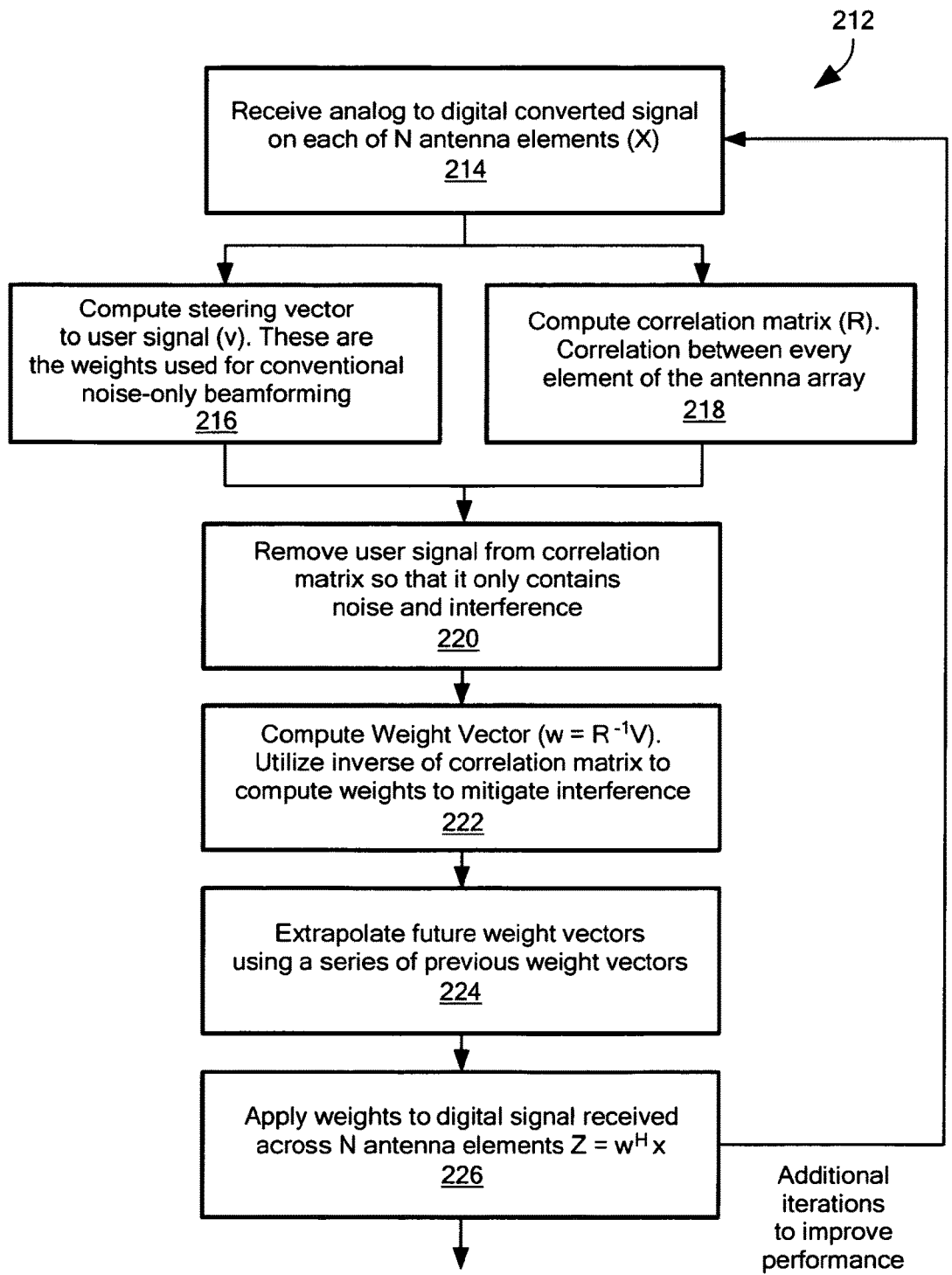
FIG. 2B is a flowchart of a beamforming process.

Referring to FIG. 2B, a process 212, which may be performed by beamforming processor 15, for forming a beam from signals transmitted by aerial relay nodes may be the same as or similar to the process described above with respect to FIG. 2A. In box 214, signals (which may be converted to digital signals) are received on each of N antenna elements (X) in box 214. In box 216, a steering vector is computed to a user signal (v). This vector may correspond to weights used in beamforming applications. In box 218, a covariance matrix R is computed between every element in the antenna array.

The covariance matrix is computed as a matrix whose elements contain the mathematical correlation between the received signal from each of the relay paths (e.g. 18a, 18b, . . . , 18n). Entries in the covariance matrix may include one or more of an average of the product of a chosen vector component and the conjugate of another chosen vector component, given components of mean zero. Entries in the covariance matrix may be indexed by the ordered pair of chosen components.

For example, beamforming processor 15 may analyze parameters of the received reference signature to determine the position of aerial relay nodes with respect to each other, clock skew between the aerial relay nodes, Doppler effect of the received signal from an aerial relay node, relative motion of the aerial relay nodes, etc.

In box 220, the user signal may be removed from the covariance matrix so that the covariance matrix contains only noise and interference. In box 222, a weight vector w=inverse(R)*v is computed. In embodiments, the inverse of the covariance matrix may be used to mitigate interference.

In box 224, future weight vectors may be extrapolated using a series of previously computed weight vectors. In box 226, the weight signals are applied to the digital signal received from the aerial relay nodes. Additional iterations may be performed in order to improve performance. In an embodiment, the additional iterations may mitigate changes in the signal due to changes in the antenna array—caused by further movement or clock skew of the relay nodes, for example.

Figure 3:
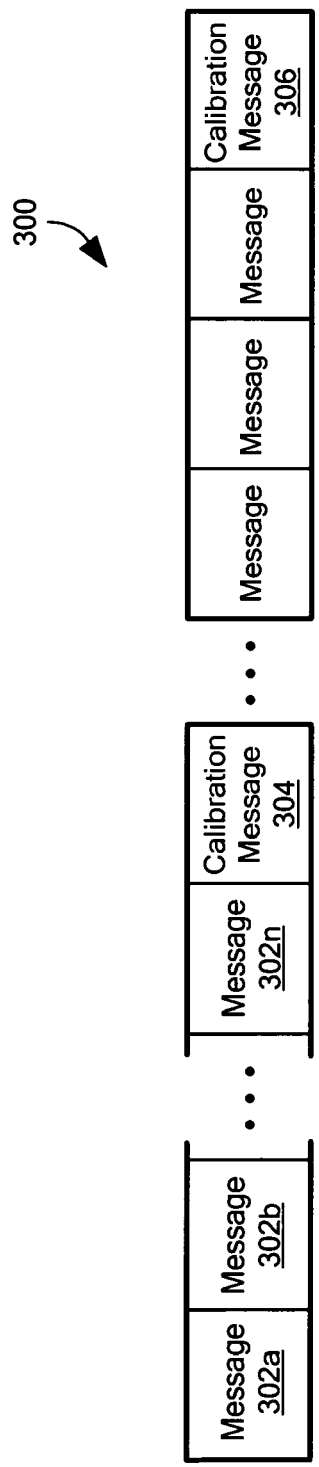
FIG. 3 is a block diagram of a messaging sequence.

Referring now to FIG. 3, a message sequence 300 includes a data portion comprising messages 302a-302n and a reference signature 304. As noted above, a communication platform 10a may send a series of transmissions (i.e. messages 302a-302n) to an antenna array comprising an array of aerial relay nodes 12a-12n. The aerial relay nodes may then re-broadcast the signals so they can be received by communication platform 10b. The data portion may include unknown data transmitted from a source (e.g. communication platform 10a) to one or more destinations (e.g. communication platform 10b). This unknown data may include the message that is being communicated from communication platform 10a to communication platform 10b. The reference portion may comprise known data that can be used to derive weighting and phase vectors for the current state and position of the antenna array. In an embodiment, the weighting vectors may include outputs of finite-input-response (FIR) filters. The FIR filters may have frequency shifts applied to its taps if, for example, a delay-Doppler processing receiver is required.

Reference signature 304 may be injected periodically in the message stream. In an embodiment, reference signature 304 may be transmitted by the sending communication platform 10a, or transmitted by the receiving communication platform 10b, or may be computed by the aerial relay nodes 12a-12n. In each case, the reference signature may be broadcast as a reference signature by the aerial relay nodes and received by the receiving communication platform 10b. As noted above, the reference signature may be a predetermined data sequence, a pseudo-random data sequence, a signature hopping data sequence, or any other type of data sequence that can be known by receiving platform 10b prior to being received by receiving platform 10b.

Once received, beamforming processor 15 may analyze the received reference signature. The position, motion, and clock timing of the transmitting relay node may affect the amplitude, timing, or other parameters of the reference signature sent by the relay node. Beamforming processor 15 may analyze these parameters to generate one or more of amplitude, delay, and phase values or vectors (i.e. weights) that can be applied to the received messages 302a-302n in order to from a beam from the received messages. Once the weights (e.g. amplitude and phase vectors) are applied and a composite signal is formed, beamforming processor 15 and/or demodulation processor 17 can retrieve the original message sent by the sending communication platform 10a.

As shown in FIG. 3, reference signatures (e.g. reference signatures 304 and 306), can be transmitted periodically. Because aerial relay nodes may move independently of each other, the amplitude, delay, and phase vectors that are applied to the received signals from the relay nodes may change. Periodically sending a reference signature may allow beamforming processor 15 to periodically recalculate the weights to be applied to the received signals in response to movement of one or more of the aerial relay nodes move.

Figure 4:
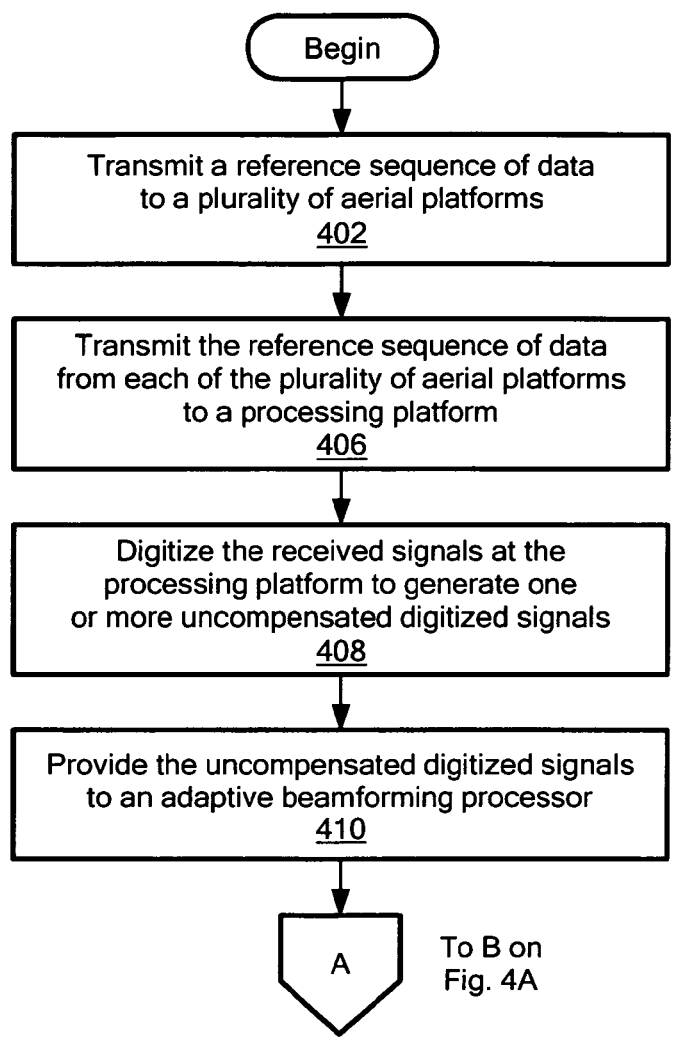
FIG. 4 and FIG. 4A are flowcharts of a process for generating weighting signals and demodulating a received signal.
Figure 4A:
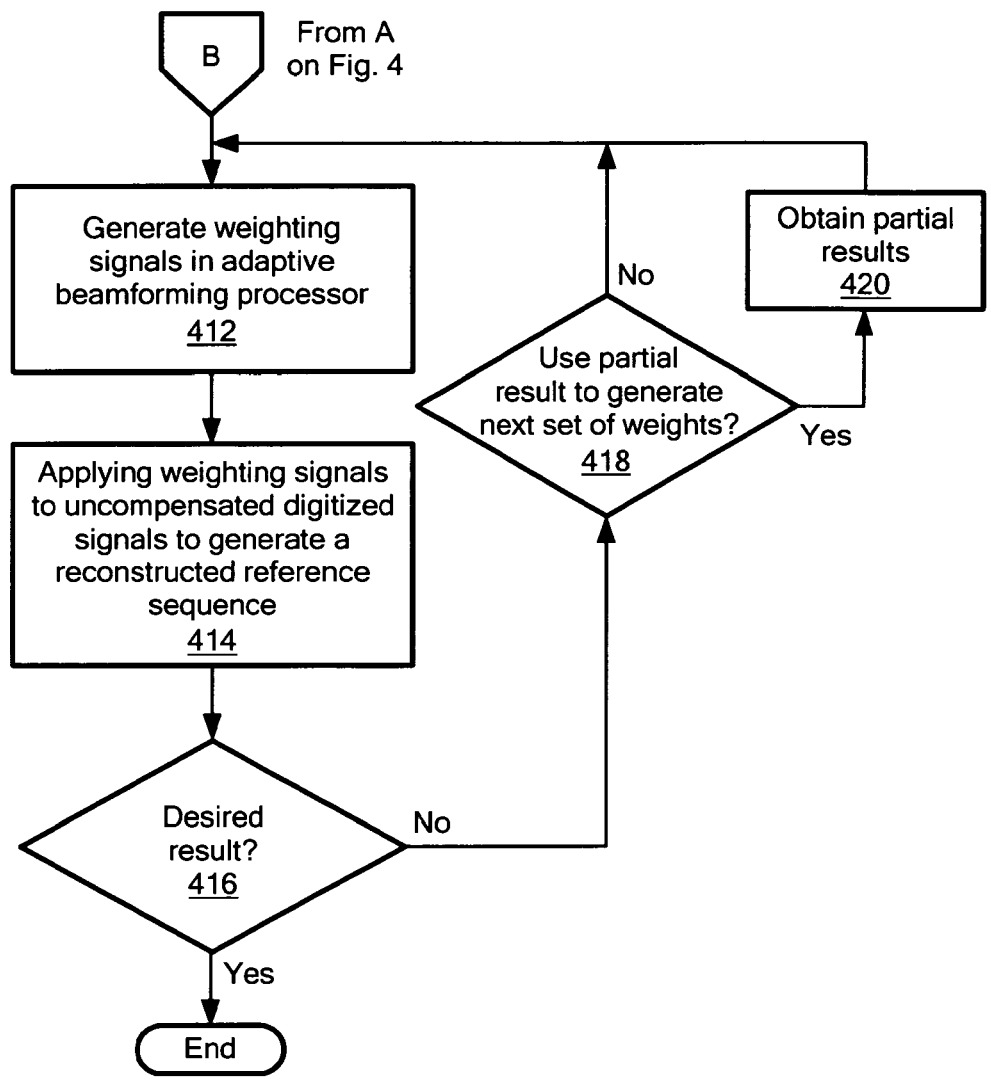

Referring to FIG. 4 and FIG. 4A, a process for forming a beam from an array of independent aerial relay nodes includes, in box 402, transmitting a reference signature to a plurality of aerial platforms (e.g. aerial relay nodes). The reference sequence may be received by all or fewer than the number of aerial platforms to which the reference signature was transmitted.

In box 406, the reference sequence is transmitted from the aerial platforms to a processing platform (e.g. communications platform 10b). In box 408, the received signals are digitized to generate one or more uncompensated digitized signals, which are provided to an adaptive beamforming processor 15 in box 410.

In box 412, beamforming processor 15 may generate weighting signals (e.g. amplitude, delay, and/or phase scalar values or vectors) as described above. In box 414, the weighting signals may be applied to the uncompensated digitized signals to generate a reconstructed reference sequence.

If the desired result is not achieved in box 416, for example if the SNR of received messages is too low using the computed weighting signals and/or if the message cannot be accurately extracted from the received signals, the process may proceed to box 418. If a partial result is to be used to generate the next set of weights, then partial results are obtained in box 420 and the process proceeds to box 412 to again generate the weighting signals. Otherwise, the process proceeds directly from box 418 to box 412 to again generate the weighting signals. The partial results in box 420 may be obtained, for example, from a previous iteration of the process in order to reduce processing overhead during the next iteration of calculation of the weighting vectors.

Figure 5:
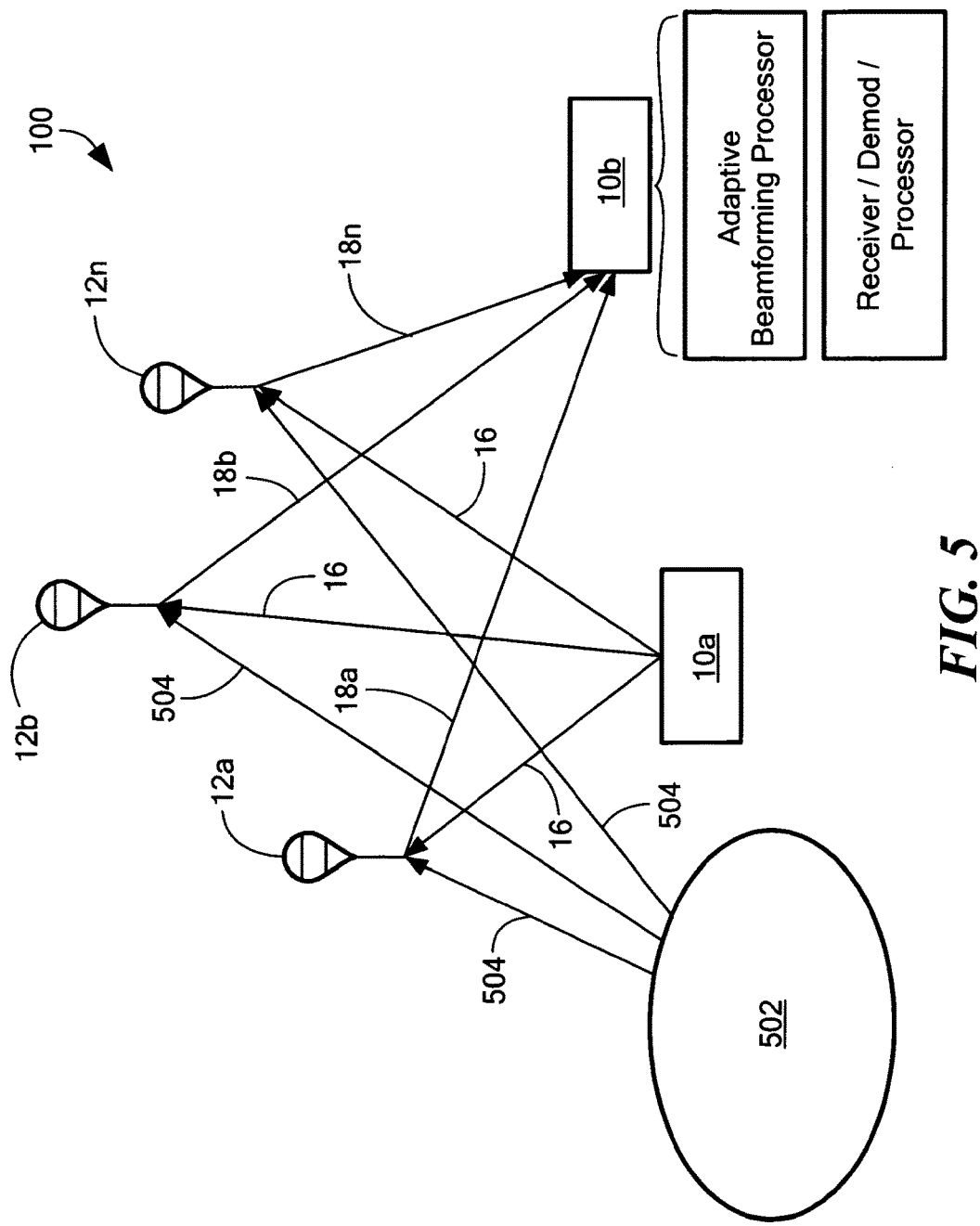
FIG. 5 is a block diagram of a distributed airborne adaptive beamforming system showing a jammer.

Referring to FIG. 5, an interference source 502 may transmit an interfering signal 504 which is received by one or more of the aerial relay nodes 12a-12n. User signal 16 and a jammer signal 15 are transmitted to one or more of the aerial relay nodes 12a-12n. In the case where interference sources exist, the user communication signal may be required to reach more relay nodes than there are interference sources. Those aerial relay nodes which receive the communication signals 16, which may be all of the aerial relay nodes, combine the signals 16 provided thereto and perform a frequency translation (or another type of multiplexing as described above). The combined, frequency-translated signals 18a-18N (dash-dot lines and also sometime referred to herein as downlink signals) are transmitted from the aerial relay nodes 12a-12n to the platform 10b. Each aerial relay node transmits the downlink signal 18a-18n on a different downlink frequency (or using another multiplexing scheme). Thus, the frequency, timing, and/or encoding of uplink signals 16 to the aerial relay nodes 12a-12n may be different than that of the downlink signals 18a-18n transmitted from the aerial relay nodes.

Beamforming processor 15 may generate weighting vectors based on the interference signal 504. This weighting vector can be applied to signals 18a-18n to reduce interference from the interference source 502 so as to reduce the signal to noise ratio for the interference signal 504.

As noted above, the concepts, systems and techniques described herein are not limited to sea vessels and can apply to any mix of users within communication reach of the relay nodes. For example, each aerial relay node need not be the same and each communication platform need not be the same. Furthermore, the concepts, systems and techniques described herein are not limited to two users, but rather can be deployed with any desired number of users. Each user can communicate with one receiver, or with multiple receivers as desired via the aerial relay nodes. As also noted above, concepts, systems and techniques described herein are not limited to balloon communication relays and can apply to any airborne relay which can provide coverage to a user area of interest. For desired operation in situations where a jammer exists, the concepts, systems and techniques described herein may require more aerial relays than interference sources. This provides the system having sufficient degrees of freedom to attenuate the interference sources.

To increase capacity, the number of users occupying the same frequency and time allocation can be increased and in effect create an interference scenario that can be mitigated through the aerial distributed beamforming array to increase capacity. With all of these distributed sparse beamforming arrays there are grating lobes and gain lobes that are created and must be addressed through the beamforming algorithms to optimize the signal to noise ratio.

While particular embodiments of the concepts, systems and techniques described herein have been shown and described, it will be apparent to those skilled in the art that various changes and modifications in form and details may be made therein without departing from the spirit and scope of the invention as defined by the following claims. Accordingly, the appended claims encompass within their scope all such changes and modifications.

The invention claimed is:

1. A system comprising:
   two or more aerial relay nodes, at least one of which can move independently of at least one of the other two or more aerial relay nodes;

a receiver to receive a transmission from each of the two or more aerial relay nodes and convert the transmission to a digital representation of each transmission at an output thereof, wherein the transmission comprises at least a data message and a reference signature for calculation of desired beamforming weights; and an adaptive beamforming processor, coupled to the output of said receiver, said adaptive beamforming processor configured to:
receive the digital representation of each transmission from each of the two or more aerial relay nodes including the reference signature for calculation of the desired beamforming weights from each of the two or more aerial relay nodes;
generate a set of beamforming weights from signals received from two or more aerial relay nodes where said weights are based on parameters of the reference signature received from each respective aerial relay node wherein the reference signature parameters relate to: physical spacing between at least some of the two or more aerial relay nodes; relative motion between at least some of the two or more aerial relay nodes; and signal timing between at least some of the two or more aerial relay nodes and wherein the set of weights compensates for at least physical spacing, relative motion, and signal timing;
apply the weights to the respective transmission received from the respective relay node to form a reconstructed signal forming an effective desired beampattern; and
process the reconstructed signal through a desired beamformer.

2. The system of claim 1 wherein the system further comprises a transmitter configured to transmit the reference signature for calculation of the desired beamforming weights to the aerial relay nodes prior to the receiver receiving an aerial relay node transmission from each of the two or more aerial relay nodes, wherein the aerial relay node transmission includes the reference signature for calculation of the desired beamforming weights.

3. The system of claim 1 wherein said receiver receives an analog version of the aerial rely node transmission and said receiver further comprises a digitizing circuit to convert the analog version of the aerial relay node transmission from each of the two or more aerial relay nodes to a digital signal.

4. The system of claim 1 wherein said adaptive beamforming processor comprises at least one of an amplitude adjustment circuit and a phase adjustment circuit such that the set of weights comprise at least one of amplitude and phase adjustment values to be applied to a digitized version of the aerial rely node transmission.

5. The system of claim 1 wherein the aerial relay nodes each have independent clocks.

6. The system of claim 1 wherein the aerial relay nodes are not in communication with each other.

7. The system of claim 1 wherein the reference signature comprises parameters to determine characteristics of each respective aerial relay node and the reference signature is used by the adaptive beamforming processor to generate a set of weights, phase and delay vectors based upon a current state of an antenna array and which compensates for at least physical spacing, relative motion, and signal timing of the two or more aerial relay nodes such that the adaptive beamforming processor can form a beam from the transmissions from each of the two or more aerial relay nodes received by the receiver.

8. The system of claim 7 wherein a user signal is embedded with the reference signature and the reference signature comprises one or more of:
a predefined pattern of reference bits embedded in a bit-stream identifying the user;
a direct sequence spreading sequence identifying the user;
a frequency hopping pattern identifying a user
a pseudo-random code that is known to the receiver; or
a signature hopping pattern that is known to the receiver.

9. The system of claim 1 further comprising a downlink receiver and wherein the reference signature corresponds to an uplink signal that is known by the downlink receiver.

10. The system of claim 9 wherein the adaptive beamforming processor corresponds to the downlink receiver.

11. The system of claim 1 wherein the adaptive beamforming processor is configured to analyze parameters of a received reference signature to determine a position of the two or more aerial relay nodes with respect to each other, clock skew between the two or more aerial relay nodes, Doppler effect of the received signal from an aerial relay node, and relative motion of the two or more aerial relay nodes.

12. The system of claim 1 wherein the adaptive beamforming processor is configured to, in response to that characteristics of the reconstructed signal is different from a desired result, generate a next set of beamforming weights for the signals received from two or more aerial relay nodes based upon the characteristics of the reference signature and the set of previously generated beamforming weights.

13. A beamforming system for forming a beampattern based upon signals received from a plurality of aerial relay nodes, at least one of which can move independently of at least one of the other two or more aerial relay nodes, the beamforming system comprising:
receiving means for receiving a plurality of aerial relay node transmissions from at least two of the plurality aerial relay nodes, wherein each aerial relay node transmission having a transmit frequency which is unique with respect to a transmit frequency of other one of the plurality of aerial relay nodes and which includes at least a data portion and a reference signature;
digitizing means, coupled to said receiving means, said digitizing means for receiving the plurality of aerial relay node transmissions provided thereto from said receiving means and for digitizing the plurality of aerial relay node transmissions;
an adaptive beamforming processor having an input and an output with the input coupled to receive digitized aerial relay node transmissions from an output of said digitizing means, said adaptive beamforming processor for:
generating a set of weighting signals for each of the aerial relay node transmissions wherein the set of weighting signals are selected to allow said adaptive beamforming processor to detect the reference signature of the aerial relay node transmission received from each respective aerial relay node, wherein parameters of the reference signature relate to physical spacing between at least some of the plurality of aerial relay nodes, relative motion between at least some of the plurality of aerial relay nodes, and signal timing between at least some of the plurality of aerial relay nodes and wherein the set of weighting signals compensates for at least physical spacing, relative motion, and signal timing; and
providing the set of weighting signals at the output thereof;

a weighting means, having a first input coupled to receive weighting signals from said adaptive beamforming processor, a second input coupled to the output of said digitizing means and having an output, said weighting means for applying a set of weighting signals provided thereto from said adaptive beamforming processor to respective ones of the digitized aerial relay node transmissions to form a weighted set of digitized aerial relay node transmissions at an output thereof; and a summing means, coupled to said digitizing means, said summing means for summing the weighted digitized aerial relay node transmissions to form a beam at an output of the beamforming system.

14. The beamforming system of claim 13 wherein said receiving means comprises an antenna having an output coupled to an input of said digitizing means.

15. The beamforming system of claim 13 wherein said receiving means comprises:
   an antenna having an output; and
   a frequency translation circuit having an input coupled to the output of said antenna and having an output coupled to an input of said digitizing means.

16. The beamforming system of claim 13 wherein said digitizing means comprises an analog to digital converter having an input coupled to the output of said receiving means and an output coupled to an input of said weighting means.

17. The beamforming system of claim 13 wherein said weighting means comprises at least one of a signal phase adjustment circuit; and a signal amplitude adjustment circuit.

18. The beamforming system of claim 13 wherein said weighting means comprises of a set of Finite Impulse Response (FIR) filters with a set of time delayed weights.

19. An adaptive beamforming processor for receiving a plurality of digitized aerial relay node transmissions, each of the plurality of digitized aerial relay node transmissions provided from a corresponding one of a plurality of independent aerial relay nodes, the adaptive beamforming processor comprising:

a weighting processor for generating a set of weighting signals for each of the aerial relay node transmissions wherein the set of weighting signals are selected such that the adaptive beamforming processor is configured to:

identify a reference signal portion of the aerial relay node transmission received from each respective aerial relay node; and compute a steering vector comprising the weighting signals based upon parameters of the reference signal portion, wherein the parameters of the reference signal portion relate to physical spacing between at least some of the plurality of independent aerial relay nodes, relative motion between at least some of the plurality of independent aerial relay nodes, and signal timing between at least some of the plurality of independent aerial relay nodes;

compute a covariance matrix representing a correlation between each aerial relay node that produced the aerial relay node transmissions;

compute a weight vector to be applied to the aerial relay node transmissions, wherein the weight vector compensates for at least physical spacing, relative motion, and signal timing; and apply the weight vector to the aerial relay node transmissions to generate a set of corrected aerial relay node transmissions.

20. The adaptive beamforming processor of claim 19 wherein the weighting processor is configured to generate a set of weights from interference signals from undesired transmitters, and applies weights from the interference signals to the aerial relay node transmissions to minimize interference from the undesired transmitter.

* * * * *